(12) United States Patent
Pletka et al.

(10) Patent No.: US 11,797,199 B2
(45) Date of Patent: Oct. 24, 2023

(54) BALANCING UTILIZATION OF MEMORY POOLS OF PHYSICAL BLOCKS OF DIFFERING STORAGE DENSITIES

(71) Applicant: INTERNATIONAL BUSINESS MACHINES CORPORATION, Armonk, NY (US)

(72) Inventors: Roman Alexander Pletka, Uster (CH); Aaron Daniel Fry, Richmond, TX (US); Nikolaos Papandreou, Thalwil (CH); Radu Ioan Stoica, Zurich (CH); Charalampos Pozidis, Rueschlikon (CH); Nikolas Ioannou, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 17/368,411

(22) Filed: Jul. 6, 2021

(65) Prior Publication Data

US 2023/0010632 A1  Jan. 12, 2023

(51) Int. Cl.
*G06F 3/06* (2006.01)
*G06F 12/02* (2006.01)

(52) U.S. Cl.
CPC .......... *G06F 3/0631* (2013.01); *G06F 3/0604* (2013.01); *G06F 3/0679* (2013.01); *G06F 12/0253* (2013.01); *G06F 2212/7205* (2013.01)

(58) Field of Classification Search
CPC .... G06F 3/0631; G06F 3/0604; G06F 3/0679; G06F 12/0253; G06F 2212/7205
See application file for complete search history.

(56) References Cited

U.S. PATENT DOCUMENTS

| | | | |
|---|---|---|---|
| 2016/0098213 A1 | 4/2016 | Franceschini et al. | |
| 2019/0095116 A1* | 3/2019 | Igahara | G06F 12/0246 |
| 2020/0401322 A1* | 12/2020 | Yeh | G06F 3/0616 |
| 2020/0401513 A1 | 12/2020 | He et al. | |
| 2021/0004158 A1* | 1/2021 | Pletka | G06F 3/064 |
| 2021/0004159 A1 | 1/2021 | Pletka et al. | |

(Continued)

OTHER PUBLICATIONS

Anonymous, Proactive Disabling Relief Valve to Ensure Proper Pool Resizing; IP.com Prior Art Database, IP.com No. IPCOM000263454D, 2020.

*Primary Examiner* — Michael Krofcheck
(74) *Attorney, Agent, or Firm* — Brian F. Russell; Eyal Gilboa

(57) ABSTRACT

A non-volatile memory includes a plurality of physical blocks each including a respective plurality of cells, where each cell is individually capable of storing multiple bits of data. A controller for the non-volatile memory maintains dynamically resizable pools of physical blocks, including at least a low-density pool of physical blocks in which cells are configured to store a fewer number of bits and a high-density pool of physical blocks in which cells are configured to store a greater number of bits. The controller detects an imbalance in utilization between the low-density and high-density pools and, based on detection of the pool imbalance, restricts data placement in the low-density pool, enables garbage collection from the low-density pool back into the low-density pool to compact the low-density pool, and re-enables data placement to the low-density pool based on availability of a threshold number of free physical blocks in the low-density pool.

20 Claims, 8 Drawing Sheets

(56) References Cited

U.S. PATENT DOCUMENTS

| | | | |
|---|---|---|---|
| 2021/0117317 A1* | 4/2021 | Masuo | G06F 3/0679 |
| 2021/0294737 A1* | 9/2021 | Wang | G06F 12/0822 |
| 2021/0405900 A1* | 12/2021 | Kurita | G06F 3/0644 |
| 2022/0066638 A1* | 3/2022 | Luo | G06F 3/0604 |
| 2022/0261182 A1* | 8/2022 | Galenchik | G06F 3/0679 |

* cited by examiner

BALANCING UTILIZATION OF MEMORY POOLS OF PHYSICAL BLOCKS OF DIFFERING STORAGE DENSITIES

BACKGROUND OF THE INVENTION

This disclosure relates to data processing and data storage, and more specifically, to a non-volatile memory system in which physical blocks of memory are capable of operating in differing modes providing differing per-cell bit storage capacities. Still more particularly, the disclosure relates to techniques of balancing utilization of pools of physical blocks operating in the differing block modes.

NAND flash memory is an electrically programmable and erasable non-volatile memory technology that stores one or more bits of data per memory cell as a charge on the floating gate of a transistor or a similar charge trap structure. The amount of charge on the floating gate modulates the threshold voltage of the transistor. By applying a proper read voltage and measuring the amount of current, the programmed threshold voltage of the memory cell can be determined, and thus the stored information can be detected. In a typical implementation, a NAND flash memory array is organized in physical blocks (also referred to as "erase blocks") of memory, each of which includes multiple physical pages each in turn containing a multiplicity of memory cells. By virtue of the arrangement of the word and bit lines utilized to access the memory cells, flash memory arrays have generally been programmed on a page basis, but erased on a block basis.

Flash storage technology has seen an impressive growth in bit storage density over the past decade, driven by the objective of decreasing the price per gigabyte of flash storage. One of the key drivers of this trend is the steady increase in the number of bits stored per flash cell. For example, the number of bits that can be stored per flash cell has steadily increased from one (Single Level Cell (SLC)) to two (Multi-Level Cell (MLC)) to three (Three Level Cell (TLC)) and, most recently, to four (Quad Level Cell (QLC)). The increased number of bits that can be stored per flash cell comes at the cost of decreased endurance and performance as the number of bits per cell increases.

Enterprise-class flash controllers employ a variety of techniques to ameliorate the endurance and performance limitations of new generations of the NAND flash memory. For example, flash controllers may employ one or more flash management techniques, including implementing advanced error correction codes, adjusting voltage levels to reduce bit error rate, reducing internal garbage collection overhead by segregating data based on write heat, managing blocks based on block wear (i.e., health binning), and performing health-aware wear leveling and data placement. Despite the longevity and performance gains contributed by these advanced flash management techniques, as bit density continues to grow, the existing flash management techniques alone cannot guarantee an acceptable device lifetime. For example, QLC NAND flash technology provides a 33% increase in storage density compared to TLC NAND flash technology, but has a rated useful life several times less than TLC NAND flash (e.g., perhaps only a few thousands program/erase (P/E) cycles per block).

One promising avenue for increasing device endurance is to take advantage of the ability of NAND flash memory to operate in multiple modes. For example, some QLC and TLC NAND flash memory supports an SLC mode in which certain selected blocks store only a single bit per cell, thus increasing performance and endurance for the selected blocks at the expense of storage density. Blocks configured in the SLC mode can sustain one to two orders of magnitude more P/E cycles, but provide significantly less storage capacity than blocks configured in TLC or QLC mode. In such systems, frequently written data can be stored in the SLC blocks, while infrequently written data can be stored on blocks operating in the TLC or QLC mode.

Existing flash controllers that support multiple operating modes often employ a tiered architecture in which incoming host writes are first stored in the blocks of a low-density storage tier (e.g., a SLC tier). When storage in the low-density storage tier is exhausted (or reaches some other threshold fill level), the flash controller initiates a destaging process that frees space in the low-density storage tier by moving data from the low-density storage tier to a high-density storage tier (e.g., a TLC or QLC tier), preferably starting with the data least likely to be overwritten in the future. The flash controller then manages data residing in the high-density storage tier in the conventional manner, for example, by periodically relocating valid data from blocks selected for garbage collection, erasing the garbage-collected blocks, and thereafter again writing the erased blocks with data destaged from the lower density storage tier or data being relocated by the garbage collection process from the high-density storage tier.

The present disclosure recognizes that it is desirable to maintain balance of utilization of the physical blocks assigned to the various storage tiers. The present disclosure additionally recognizes that if balance of utilization of the pools is not maintained and/or restored, write amplification in an over-utilized storage pool can spike, leading to excess wear and potentially early device wear out.

BRIEF SUMMARY

In one or more embodiments, a non-volatile memory includes a plurality of physical blocks each including a respective plurality of cells, where each cell is individually capable of storing multiple bits of data. A controller for the non-volatile memory maintains dynamically resizable pools of physical blocks including at least a low-density pool of physical blocks in which cells are configured to store a fewer number of bits and a high-density pool of physical blocks in which cells are configured to store a greater number of bits. The controller detects an imbalance in utilization between the low-density and high-density pools and, based on detection of the pool imbalance, restricts data placement in the low-density pool, enables garbage collection of data from the low-density pool back into the low-density pool to compact the low-density pool, and re-enables data placement to the low-density pool based on availability of a threshold number of free physical blocks in the low-density pool.

DETAILED DESCRIPTION

Figure 1A:
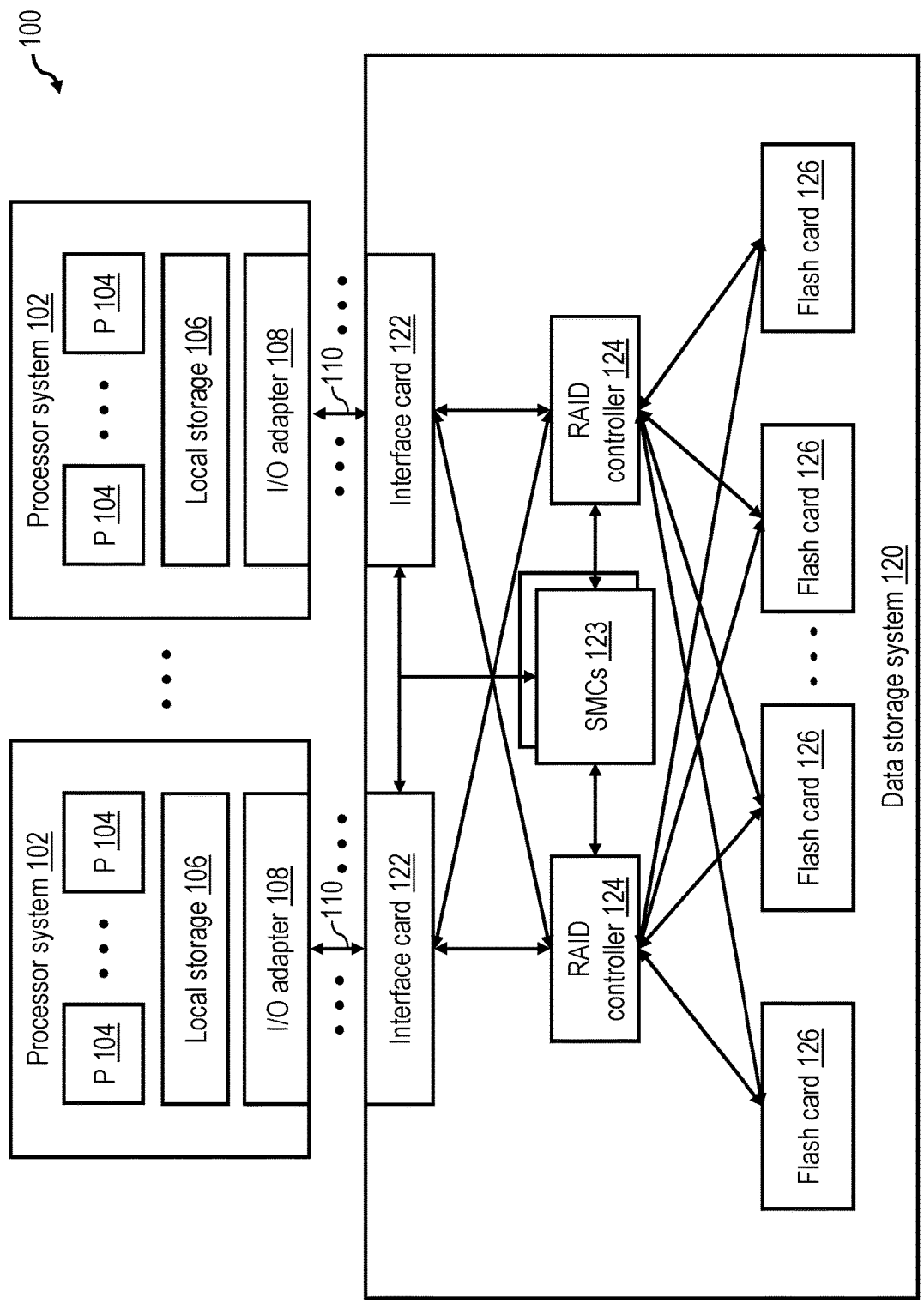
FIG. 1A is a high-level block diagram of a data processing environment in accordance with one embodiment.

With reference to the figures and with particular reference to FIG. 1A, there is illustrated a high-level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. A processor system 102 may additionally include local storage 106 (e.g., dynamic random access memory (DRAM) or disks) that may store program code, operands and/or execution results of the processing performed by processor(s) 104. In various embodiments, a processor system 102 can be, for example, a mobile computing device (such as a smartphone or tablet), a laptop or desktop personal computer system, a server computer system (such as one of the POWER series of servers available from International Business Machines Corporation), or a mainframe computer system. A processor system 102 can also be an embedded processor system using various processors such as ARM, POWER, Intel x86, or any other processor combined with any of memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In some embodiments, data storage system 120 may be integral to a processor system 102. In various embodiments, I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O requests communicated via I/O channel 110 include read requests by which a processor system 102 requests data from data storage system 120 and write requests by which a processor system 102 requests storage of data in data storage system 120.

Although not required, in the illustrated embodiment, data storage system 120 includes multiple interface cards 122 through which data storage system 120 receives and responds to I/O requests of hosts via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to non-volatile storage media, which in the illustrated example include multiple flash cards 126 bearing NAND flash memory. In other embodiments, alternative and/or additional non-volatile storage devices can be employed.

In the depicted embodiment, the operation of data storage system 120 is managed by redundant system management controllers (SMCs) 123, which are coupled to interface cards 122 and RAID controllers 124. In various embodiments, system management controller 123 can be implemented utilizing hardware or hardware executing firmware and/or software.

Figure 1B:
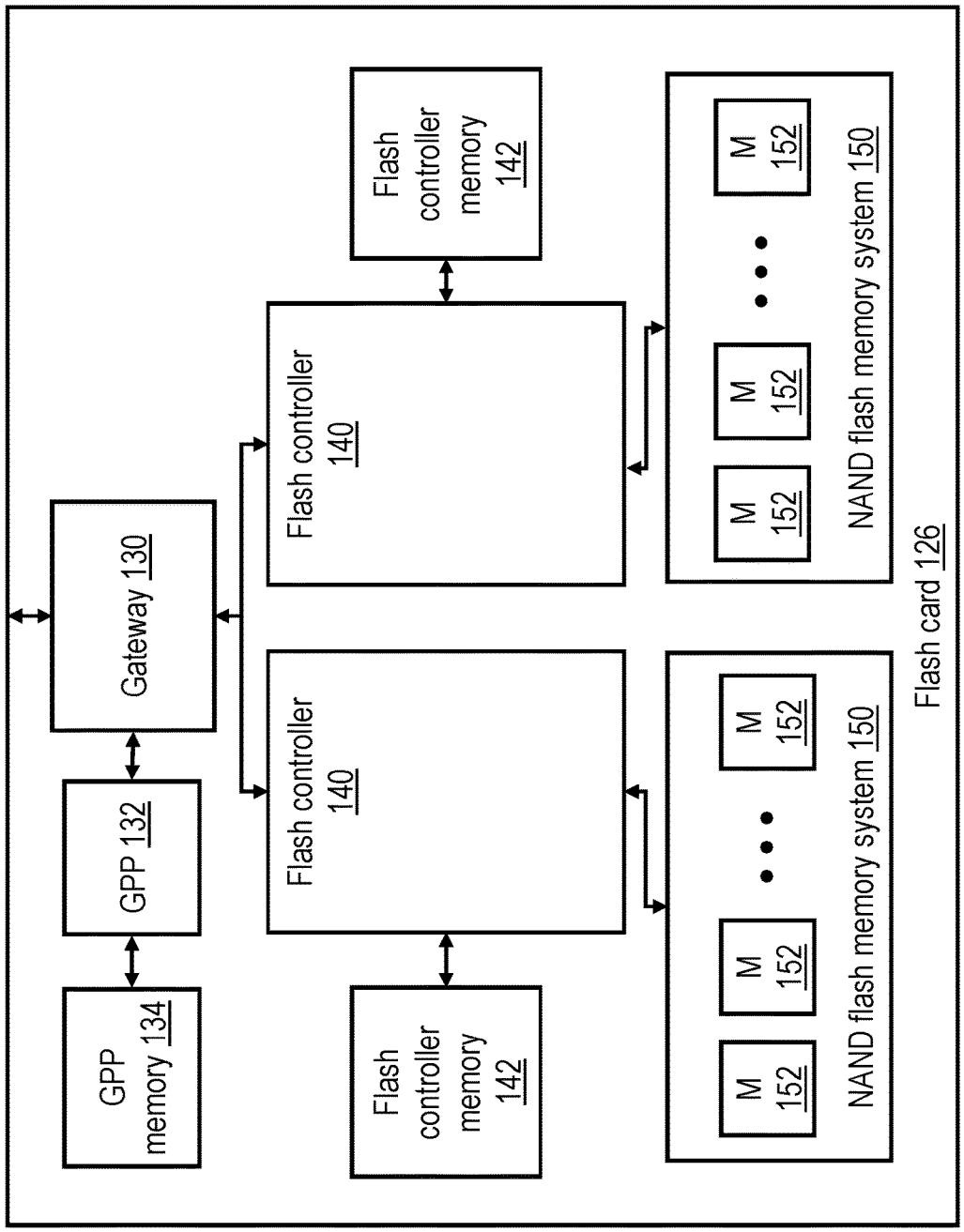
FIG. 1B is a more detailed block diagram of a flash card of the data storage system of FIG. 1A.

FIG. 1B depicts a more detailed block diagram of an exemplary embodiment of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform pre-processing on requests received by gateway 130 and/or to schedule servicing of the requests by flash card 126. GPP 132 is coupled to a GPP memory 134 (e.g., Dynamic Random Access Memory (DRAM)) that can conveniently buffer data created, referenced and/or modified by GPP 132 in the course of its processing or data flowing through the gateway 130 destined for one or more of the flash controllers 140.

Gateway 130 is further coupled to multiple flash controllers 140, each of which controls a respective NAND flash memory system 150. Flash controllers 140 can be implemented, for example, by an Application Specific Integrated Circuit (ASIC) and/or a Field Programmable Gate Array (FPGA) and/or a microprocessor, and each have an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write requests from gateway 130 that request to read data stored in NAND flash memory system 150 and/or to store data in NAND flash memory system 150. Flash controllers 140 service these requests, for example, by accessing NAND flash memory system 150 to read or write the requested data from or into NAND flash memory system 150 or by accessing a memory cache (not illustrated) associated with NAND flash memory system 150.

Flash controllers 140 implement a flash translation layer (FTL) that provides logical-to-physical address translation to enable access to specific memory locations within NAND flash memory systems 150. In general, a request received by flash controller 140 from a host device, such as a processor system 102, contains the logical block address (LBA) at which the data is to be accessed (read or written) and, if a write request, the write data to be stored to data storage system 120. The request may also specify the amount (or size) of the data to be accessed. Other information may also be communicated depending on the protocol and features supported by data storage system 120. The flash translation layer translates LBAs received from a RAID controller 124 into physical addresses assigned to corresponding physical location in NAND flash memory systems 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. In the embodiment shown in FIG. 1B, each NAND flash memory system 150 includes multiple (e.g., 32) individually addressable NAND flash memory storage devices 152. In the illustrated example, the flash memory storage devices 152 take the form of a board-mounted flash memory modules, for example, Multi-Level Cell (MLC), Three Level Cell (TLC), or Quad Level Cell (QLC) NAND flash memory modules. The effective storage capacity provided by flash memory storage devices 152 can be increased through the implementation of data compression, for example, by flash controllers 140 and/or high-level controllers, such as GPPs 132, RAID controllers 124 or SMCs 123.

Figure 2:
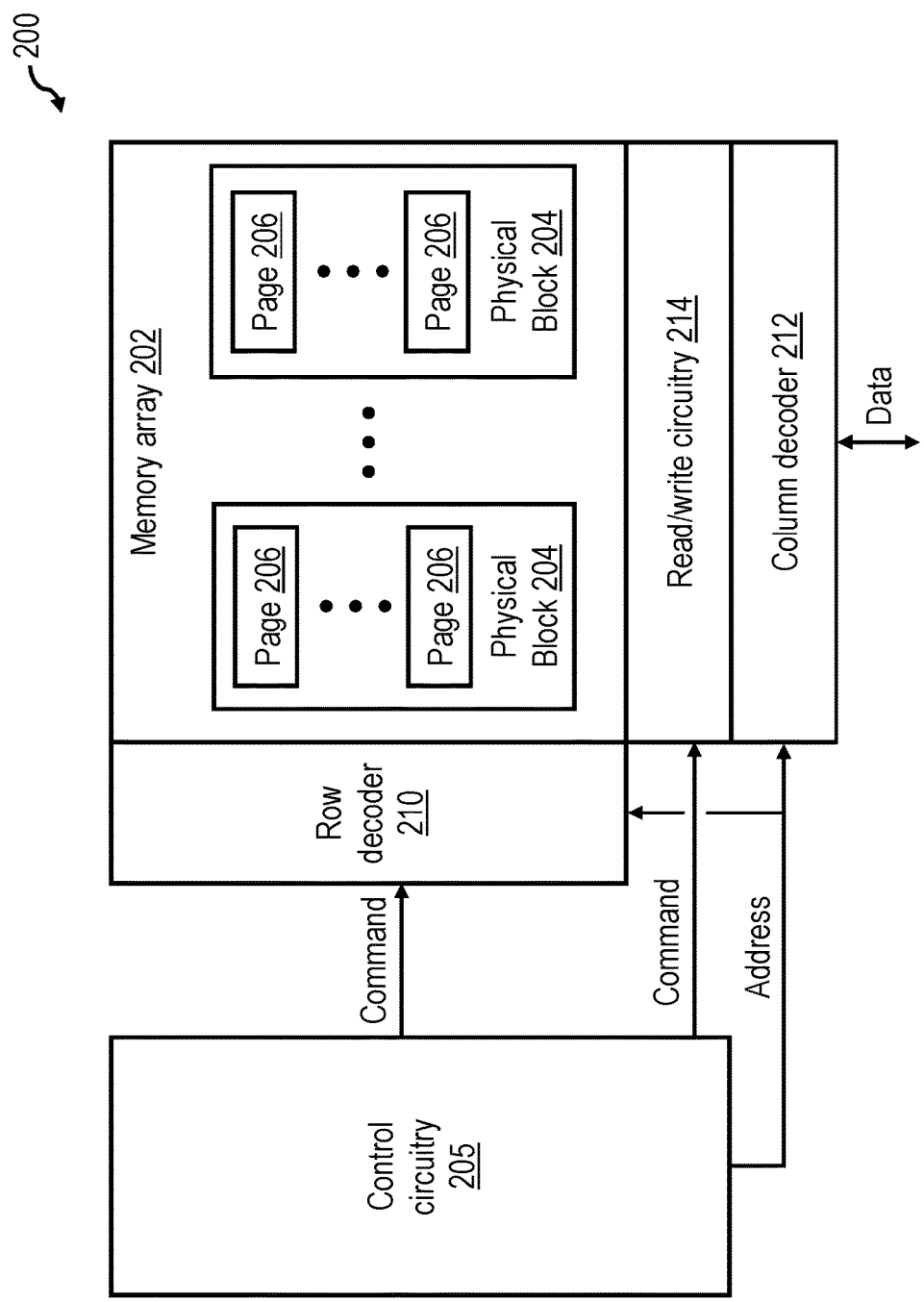
FIG. 2 depicts an exemplary NAND flash memory module in accordance with one embodiment.

Referring now to FIG. 2, there is depicted a block diagram of an exemplary flash memory module 200 that can be utilized to implement any of the NAND flash memory storage devices 152 of FIG. 1B. Flash memory module 200 includes one or more memory die, each implementing at least one memory array 202 formed of a two-dimensional or three-dimensional array of NAND flash memory cells. As indicated in FIG. 2, the memory cells within memory array 202 are physically arranged in multiple physical blocks 204, each in turn including multiple physical pages 206. These pages can be managed in page groups, which can each be formed, for example, of all the pages coupled to a common wordline, of all pages in one or more layers in a 3D NAND flash, of a set of pages in one or more layers, or generally of pages with similar characteristics.

As is known to those skilled in the art, NAND flash memory, such as that employed in memory array 202, must be erased prior to being programmed. Further, NAND flash memory can be (but is not required to be) constrained by its construction such that the smallest granule of storage that can be erased is a block 204 and the smallest granule of storage that can be accessed by a read or write request is fixed at the size of a single physical page 206. It should be appreciated in this regard that the LBAs provided by host devices correspond to logical pages within a logical address space, where each logical page typically has a size of 4 kilobytes (kB) or 16 kB. Physical pages 206 typically have a size of, for example, 16 kB. As logical pages may further be compressed, a physical page can thus host multiple logical pages.

Flash memory module 200 further includes a row decoder 210 through which word lines of memory array 202 can be addressed and a column decoder 212 through which bit lines of memory array 202 can be addressed. In addition, flash memory module 200 includes read/write circuitry 214 that enables the memory cells of a physical page 206 to be programmed or read in parallel. Flash controller 200 additionally includes control circuitry 205 that provides chip-level control of operation of memory array 202, including read and write accesses made to physical pages 206 in memory array 202, erasure of blocks 204, and the amplitude, duration and polarity of related voltages applied to memory array 202.

Having described the general physical structure of one exemplary embodiment of a data storage system 120, certain operational aspects of data storage system 120 are now described with reference to FIG. 3, which is a high-level flow diagram of some of the flash management functions and data structures employed by a GPP 132 and/or flash controller 140 in accordance with one embodiment.

Data storage system 120 does not generally allow external devices (e.g., hosts) to directly address and/or access the physical memory locations within NAND flash memory systems 150. Instead, data storage system 120 is generally configured to present to host devices one or more logical volumes each having a contiguous logical address space, thus allowing host devices to read and write data to and from logical block addresses (LBAs) within the logical address space while permitting one or more of the various levels of controllers (e.g., system management controller 123, RAID controllers 124, flash controllers 140 and GPP 132) to control where the data that is associated with the various LBAs actually resides in the physical memory locations comprising NAND flash memory systems 150. In this manner, performance and longevity of NAND flash memory systems 150 can be intelligently managed and optimized.

In the illustrated embodiment, each flash controller 140 performs logical-to-physical address translation for an associated set of LBAs using a logical-to-physical address translation data structure, such as logical-to-physical translation (LPT) table 300, which can be stored, for example, in the associated flash controller memory 142 or the NAND flash memory system 150. It should be noted that the logical address supplied to flash controller(s) 140 may be different from the logical address originally supplied to data storage system 120, since various components within data storage system 120 may perform address translation operations between the external devices and the flash controller(s) 140.

Flash management code running on the GPP 132 tracks erased physical blocks 204 of NAND flash memory system 150 that are ready to be used in ready-to-use (RTU) queues 306, which may be stored, for example, in GPP memory 134. In some embodiments, flash management code running on the GPP 132 maintains at least one RTU queue 306 per channel or plane (i.e., per data bus), and an identifier of each erased or free physical block 204 that is to be reused is enqueued in the RTU queue 306 corresponding to its channel or plane. Additionally, separate RTU queues 306 may be maintained for different health grades, heat bin/write streams, and/or block operation modes (e.g., SLC, MLC, TLC, or QLC). For example, FIG. 3 illustrates one set of one or more RTU queue(s) 306 for tracking physical blocks 204 from a low-density pool 305 allocated for low-density (e.g., SLC or MLC) storage and one set of one or more RTU queue(s) 306 for tracking physical blocks 204 from a high-density pool 307 allocated for high-density (e.g., TLC or QLC) storage. Pool membership information for physical blocks 204 can be stored, for example, in GPP memory 124 and/or flash controller memory 142, as block mode metadata. In varying embodiments, the free physical blocks tracked by RTU queues 306 may be allocated for data storage individually or may be allocated in groups to form block stripes, as is known in the art.

In response to a host write request received from a host, such as a processor system 102, a data placement function 310 of flash controller 140 determines by reference to LPT table 300 whether the target LBA(s) indicated in the host write request is/are currently mapped to physical memory page(s) in NAND flash memory system 150 and, if so, changes the status of each data page currently associated with a target LBA to indicate that the associated data is no longer valid. In addition, data placement function 310 selects a page stripe to store the write data of the write request and any non-updated (i.e., still valid) data from an existing page stripe, if any, targeted by the host write request. Assuming the use of block stripes, the selected page stripe may be allocated from either a block stripe already allocated to hold data or from a new block stripe. In a preferred embodiment, the page stripe allocation can be based on the health of the blocks available for allocation and the "heat" (i.e., estimated or measured write access frequency) of the LBA of the write data. Data placement function 310 then writes the host write data, associated metadata (e.g., cyclic redundancy code (CRC) and error correcting code (ECC) values), and parity information for the page stripe in the selected page stripe. Flash controller 140 also updates LPT table 300 to associate the physical page(s) utilized to store the write data with the LBA(s) indicated by the host device. Thereafter, flash controller 140 can access the data to service host read requests by reference to LPT table 300 as further illustrated in FIG. 3.

Flash controller 140 places identifiers of physical blocks 204 that have been fully written into one of occupied block queues 302, which flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this unused storage capacity through garbage collection performed by a garbage collection and wear leveling function 312. Garbage collection and wear leveling function 312 selects particular physical blocks 204 or block stripes for garbage collection based on a number of factors including, for example, the health of the physical blocks 204 (or block stripes) and how much of the data within the physical blocks 204 is invalid. In the illustrated example, flash controller 140 implements a separate, respective garbage collection and wear leveling function 312 for each of storage pools 305, 307.

Garbage collection and wear leveling functions 312 relocate still-valid garbage collected data into physical blocks 204 assigned to one of storage pools 305, 307. To relocate such data, garbage collection and wear leveling functions 312 issue relocation write requests to request that the valid data of the old physical blocks 204 be written to a new physical block 204 in NAND flash memory system 150. In addition, garbage collection and wear leveling functions 312 update LPT table 300 to remove the current association between the logical and physical addresses of the data. Once all remaining valid data has been moved from a physical block 204 (and, if needed, a block stripe is dissolved to decompose a garbage collected block stripe into its constituent physical blocks 204), each of the physical blocks 204 that is a target of garbage collection is then erased under the direction of flash controller 140 and/or the control circuitry 205 of the relevant flash memory module 200, and a corresponding program/erase (P/E) cycle count for each erased physical block 204 is incremented. Based on the health metrics of each erased physical block 204 (e.g., bit error rate (BER) metrics, uncorrectable errors, P/E cycle count, etc.), each erased block 204 can either retired (i.e., withdrawn from use) by the flash management functions (e.g., executed on GPP 132), or alternatively, prepared for reuse by placing an identifier of the newly erased physical block 204 on the appropriate ready-to-use (RTU) queue 306 (e.g., in the associated GPP memory 134).

Figure 3:
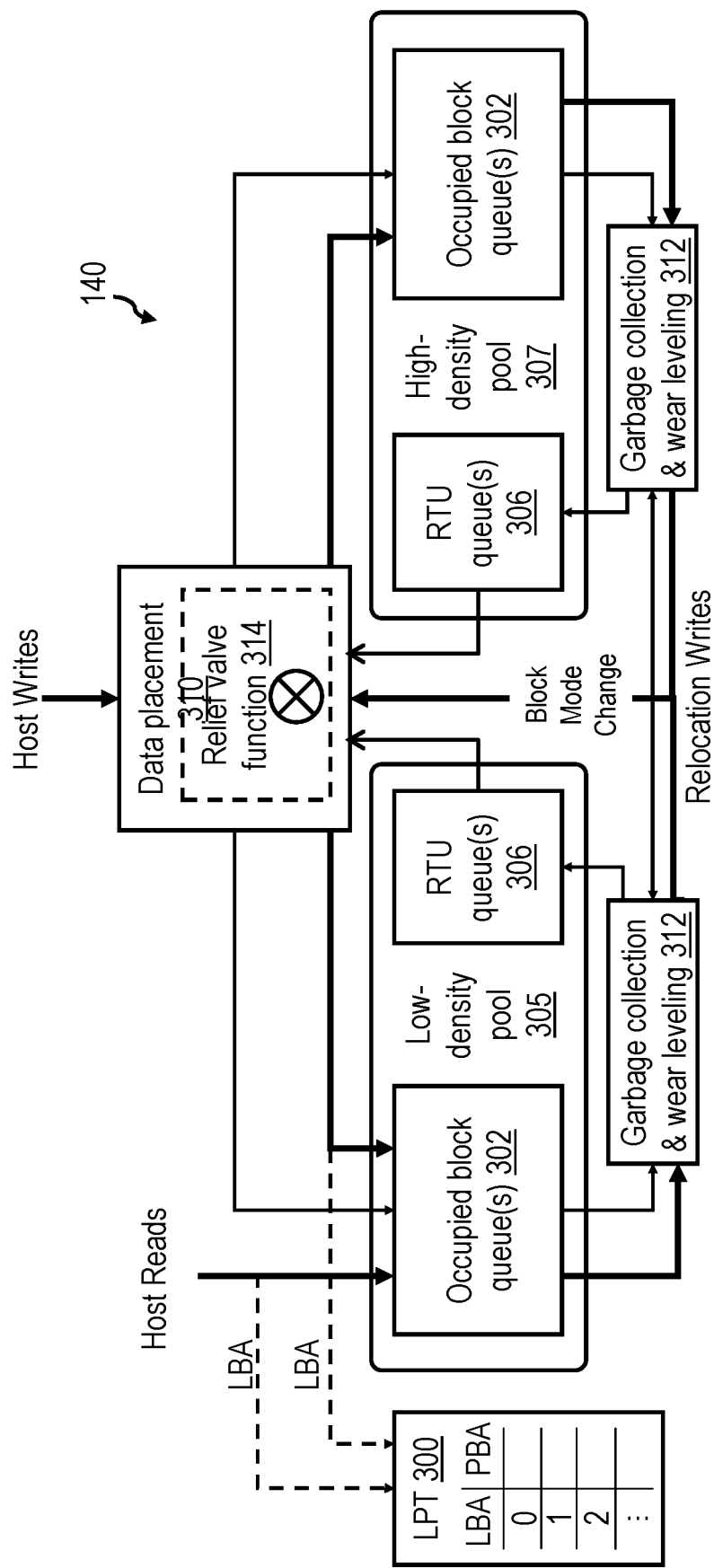
FIG. 3 is a high-level flow diagram of the flash management functions and data structures employed in flash management in accordance with one embodiment.

Although not explicitly illustrated in FIG. 3, the flash management functions executed on GPP 132 and/or flash controller 140 can additionally include a background health checker. A background health checker 330, which by definition operates independently of the read and write requests of hosts such as processor systems 102, continuously determines one or more block health metrics for physical blocks 204 recorded in occupied block queues 302. Based on the one or more of the block health metrics, the background health checker may determine to relocate data between physical blocks 204 in the same or different storage pools 305, 307. Key block health metrics that may be monitored and recorded by background health checker relate to the bit error rate (BER) metrics observed for valid blocks and physical pages, and may include, for example, the worst page BER of each block, the mean page BER of each block, the rates of change of the worst page BER and mean page BER of each block, etc. In order to obtain the most accurate health estimate possible, health can be determined from an analysis of both valid and invalid data, thereby ensuring that blocks containing almost entirely invalid data are fully analyzed to determine overall block health.

In accordance with some embodiments, data placement function 310 may optionally include a pool restriction (or "relief valve") function 314 that restricts host writes into physical blocks 204 belonging to the low-density pool 305 or the high-density pool 307. In some embodiments, relief valve function 314 is binary in application. In such embodiments, if relief valve function 314 is engaged by data placement function 310, host writes are not permitted to initially write data into physical blocks 204 belonging to low-density pool 305, but if relief valve function 314 is not engaged, host writes are permitted to store data into physical blocks 204 belonging to low-density pool 305 (and in some cases, are required to exclusively initially store write data into low-density pool 305). In some alternative embodiments, data placement function 310 implements relief valve function 314 in a non-binary fashion, meaning that relief valve function 314 can be partially applied to restrict some, but not all, host writes from initially storing write data into physical blocks 204 within low-density pool 305.

Whether or not data placement function 310 implements relief valve function 314, data placement function 310 may employ other data placement functions to avoid and/or reduce imbalance in utilization of pools 305, 307. For example, data placement function 310 may allocate initial storage of host write data between pools 305, 307 based on the relative sizes of pools 305, 307 and, if desirable and possible, initiate dynamic resizing of pools 305, 307. Alternatively or additionally, data placement function 310 may allocate the initial storage of host write data between pools 305, 307 based on the relative utilization of the storage capacities of pools 305, 307 and dynamically adjust the allocation between pools 305, 307 dynamically as the pool utilizations and/or workload properties vary over time. Note that the "relative pool utilization" refers to the amount of valid data stored in one pool relative to its current pool size, while the "overall utilization" denotes the amount of valid data stored relative to the total usable capacity of the flash card 126 and hence corresponds to the total capacity used in percent. The term "utilization" can also used in the context of blocks in which the "block utilization" describes the relation between the number of programmed blocks holding valid data and potentially also invalidated data (e.g., used blocks in the occupied block queues 302) and the number of available free blocks (e.g., blocks in the RTU queues 306). In particular, the RTU queue level is reciprocally proportional to the block utilization.

Figure 4:
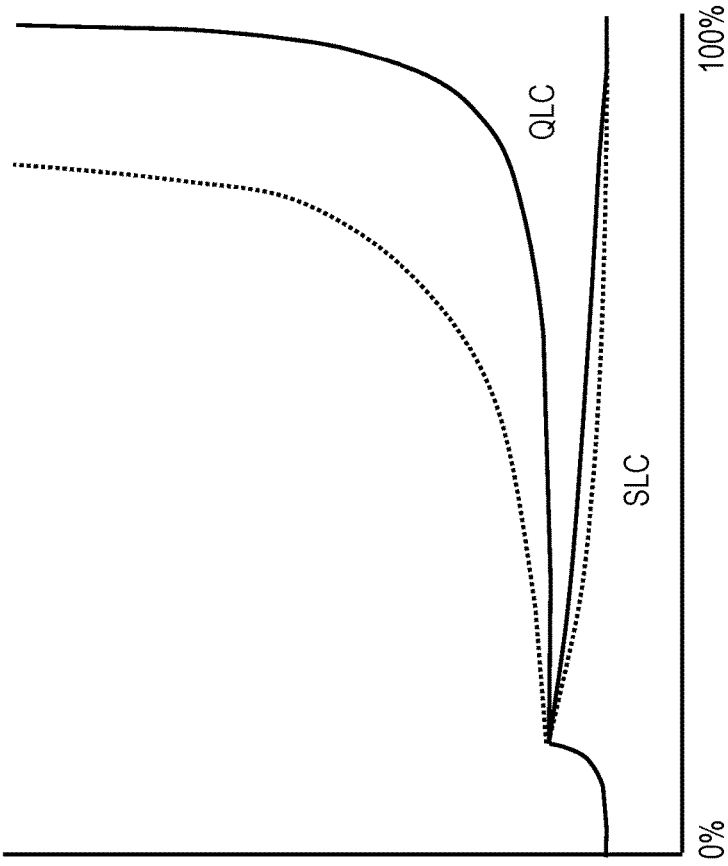
FIG. 4 depicts an exemplary tiered storage architecture in which pools of physical blocks are configured to operate in different modes storing different numbers of bits per cell.

Referring now to FIG. 4, there is depicted an exemplary multi-tier storage architecture in which data placement function 310 includes a relief valve function 314. In this specific example, a GPP 132 and/or flash controller 140 (referred to generally herein as a "controller") configures some or all of flash memory storage devices 152 in a NAND flash memory system 150 to implement two pools 400, 402 of physical blocks 204, as discussed above with reference to FIG. 3. In this example, memory array 202 comprises, for example, QLC flash memory having a native storage capacity of four bits per cell. The controller assigns some of the physical blocks 204 in the memory array 202 of a flash storage device 152 to a QLC pool 400 in which fully programmed blocks store four bits per cell and assigns other physical blocks 204 of the memory array 202 to an SLC pool 402 in which fully programmed blocks store only a single bit per cell. As noted above, operating blocks in multiple different modes in this manner can provide improved performance and/or endurance if frequently written LBAs are mapped to physical blocks 204 within SLC pool 402.

In the depicted embodiment, the controller organizes the QLC pool 400 and SLC pool 402 in a tiered arrangement in which write data contained in host write requests are, by default, initially written into physical blocks 204 selected from SLC pool 402, as indicated by default path 404. As SLC pool 402 fills through use and more capacity is needed and/or desired in SLC pool 402, the controller can destage data from SLC pool 402 to QLC pool 400 via relocation write requests, as indicated by arrow 406. To ensure an optimal size of each pool 400, 402 as well as an adequate supply of free physical blocks 204 in both of block pools 400 and 402 as the physical blocks 204 are subjected to wear, the controller (e.g., via garbage collection and wear leveling function 312) additionally dynamically transfers (reassigns) physical blocks 204 between pools 400 and 402 as needed and/or desired to provide storage capacity and/or endurance in each tier. To do so, the controller may use, for example, the total utilization, relative pool utilizations, workload properties such as the write skew, data rates, or I/O rates, RTU queue levels, write amplification, block wear and/or block health grades. The transfer of physical blocks 204 (as opposed to data) between block pools 400 and 402 is depicted in FIG. 4 by arrow 408.

In normal operation, relief valve function 314 is disengaged, and data placement function 310 writes all write data of host writes into physical blocks 204 belonging to SLC pool 402. In normal operation, during garbage collection all still-valid data garbage collected from physical blocks in SLC pool 402 by garbage collection and wear leveling function 312 is destaged to physical blocks 204 belonging to QLC pool 400. Note that, when the total utilization is low enough such that all data can be stored in the SLC pool 402, garbage collection and wear leveling function 312 may also relocate still valid data to the SLC pool 402. But with increasing utilization, write amplification from garbage collection and wear leveling of data from the SLC pool 402 back to the SLC pool 402 increases disproportionally high, such that destaging still-valid data to the QLC pool 400 is preferable. Still-valid data garbage collected from physical blocks in QLC pool 400 is also written back into physical blocks 204 belonging to QLC pool 400. During normal operation, SLC utilization varies as a function of the host write workload skew. In normal operation, the controller automatically and dynamically adjusts its destaging behavior in response to utilization imbalances. For example, if utilization of SLC pool 402 is relatively low, for example, as indicated by the amount of invalidated data in the SLC occupied block queues 302 relative to the total capacity of SLC pool 402 being greater than a relative pool utilization threshold, the controller destages little data from SLC pool 402 to QLC pool 400; if, however, utilization of SLC pool 402 is relatively high, for example, as indicated by the amount of invalidated data in the SLC occupied block queues 302 relative to the total capacity of SLC pool 402 being less than the relative pool utilization threshold, the controller destages more data from SLC pool 402 to QLC pool 400.

If data placement function 310 detects a potential imbalance between the block utilization of pools 400, 402, for example, based on the fill level of the RTU queue(s) 306 of SLC pool 402 being less than a minimum fill threshold, the controller engages relief valve function 314 to restrict host writes to physical blocks 204 belonging to SLC pool 402. In some embodiments, when engaged, relief valve function 314 imposes a complete restriction of host writes into physical blocks 204 belonging to SLC pool 402 and requires all host write data to be initially written into physical blocks 204 belonging to QLC pool 400, as indicated by bypass path 414. In other embodiments, relief valve function 314 can be engaged to impose only a partial restriction of the storage of the write data of host writes into SLC pool 402, meaning that, in at least some cases, when relief valve function 314 is engaged, some write data of host writes are initially written into SLC pool 402 via default path 404 and other write data of host writes are initially written directly into QLC pool 400 via bypass path 414. In some embodiments, when relief valve function 314 is engaged, garbage collection and wear leveling function 312 performs garbage collection on physical blocks in QLC pool 400 only and writes the garbage collected data back into physical blocks 204 belonging to QLC pool 400. The engagement of relief valve function 314 could potentially result in a imbalance between SLC and QLC pools 400, 402 because incoming host writes can invalidate data in either of SLC and QLC pools 400, 402, but write data from incoming host write are placed exclusively or predominantly into physical blocks 204 in QLC pool 400. This discrepancy in the amount of valid data in each pool increases the longer relief valve function 314 remains engaged. At some point all data in SLC pool 402 can become invalidated and the available capacity in SLC pool 402 can be unused or under-utilized until the relief valve function 314 is disengaged. At the same time, the increased utilization of QLC pool 400 results in higher write amplification. With increased utilization, write amplification increases disproportionally high, and the overall write amplification of both pools 400, 402 can consequently be higher when the pools are imbalanced compared to an architecture in which only a single pool is used. Eventually, the write amplification can require QLC pool 400 to be enlarged even though the total utilization of the flash memory storage device 152 would not otherwise require adjustment of pool sizes. This potential imbalance in pool utilization can be reduced or eliminated by the methods illustrated in FIGS. 6-9, which are discussed below.

It should be noted that these potential problems can arise in any memory system having a controller with dynamically resizable storage pools of differing storage densities, even if the controller does not implement a relief valve function 314. The problem can also arise when other data placement strategies are being used. This is because every host write invalidates data in either the SLC or QLC pool; however, depending on the data placement, new host writes can cause an imbalance in the relative utilizations of the pools as data placement may not replace the invalidated data in the same pool. This effect can be exacerbated when compression is applied because new host write data typically do not compress to the same size as data already stored in the SLC and QLC pools.

As further illustrated in FIG. 4, the controller may advantageously configure multiple (e.g., between two and eight, and in this example four) health grades 410a-410d in QLC pool 400 and a same or similar number of health grades 412a-412d in SLC pool 402. The health grade assigned to each respective block can be based, for example, on the number of program/erase (P/E) cycles and a BER metric for each physical block 204. The process for transferring blocks between block pools 400 and 402, if not carefully designed, can undesirably lead to reduced performance (due to increased error recovery activities), wear imbalance, or even to data loss in cases when the error recovery is unsuccessful (e.g., if blocks with a high bit error rate are transferred from block pool 402 to block pool 400). In general, the controller transfers blocks 408 between block pools 400 and 402 by selecting less/least healthy blocks from block pool 400 to transfer to block pool 402 and by selecting more/most healthy blocks from block pool 402 to transfer to block pool 400. Other rules to select blocks for being transferred may be used, which, for example, may consider workload properties or the relative increase in wear of the blocks in the pool, as will be understood by those skilled in the art.

Figure 5:
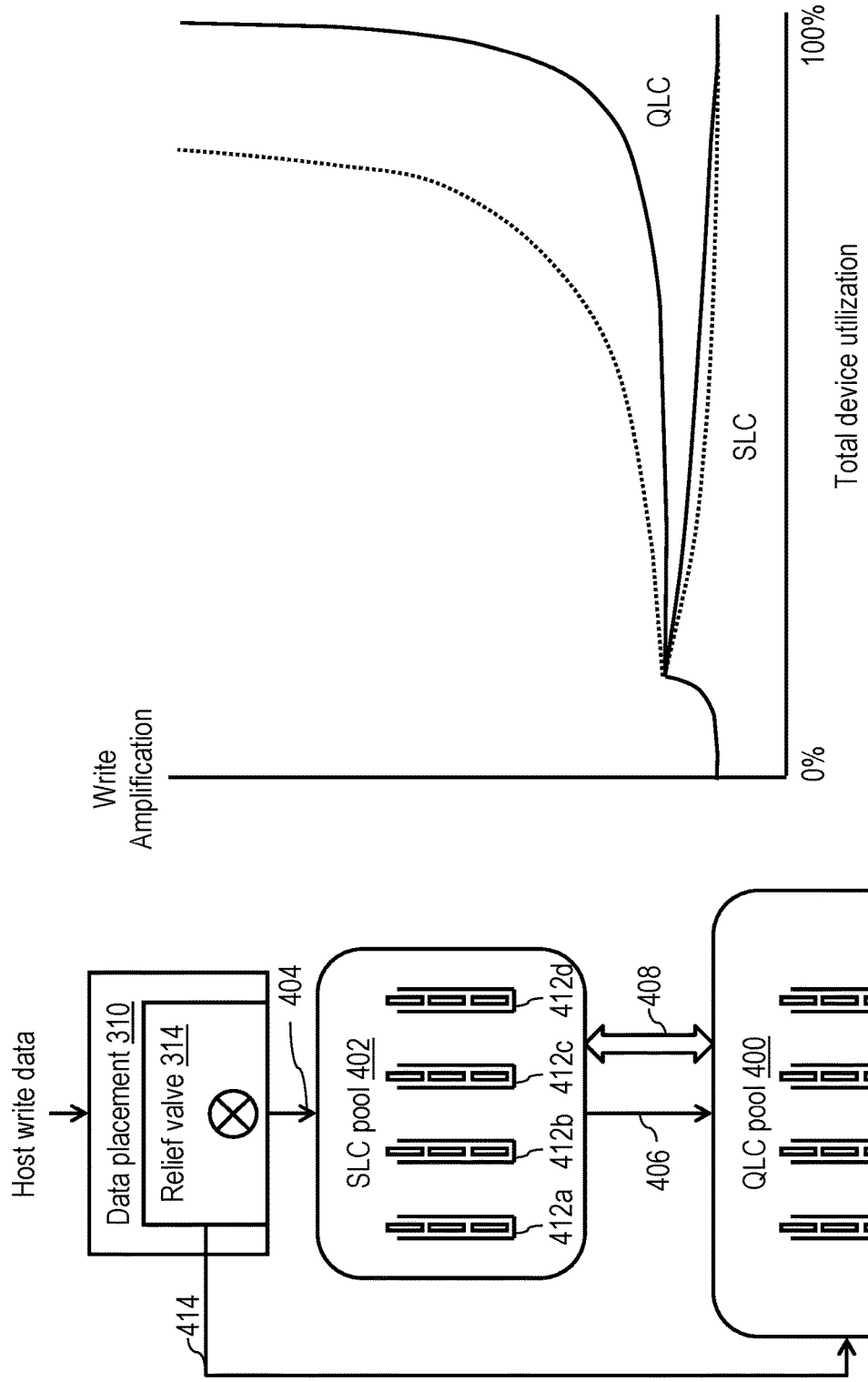
FIG. 5 is a graph of write amplification versus device utilization for an exemplary tiered storage architecture.

The present application recognizes that the block mode conversion, while a desirable function, is preferably carefully implemented, particularly in systems employing heat segregation or having very high device utilization, in order to avoid accelerated wear out and early device retirement. One reason for these negative effects is that the wear (as measured, for example, by average P/E cycles) of the blocks 204 in QLC pool 400 may in certain conditions be generally much higher than the wear of the blocks 204 in SLC pool 402 due, in part, to write amplification. FIG. 5 is a graph of write amplification versus device utilization for an exemplary tiered storage architecture as depicted in FIG. 4. In FIG. 5, the contributions from SLC and QLC garbage collection to the write amplification are shown using separate, stacked lines for optimally sized pools for the given total device utilization. The solid lines indicate the contributions to the write amplification when the relative pool utilizations of the pools are balanced, whereas the dotted lines show the contributions to the write amplification when the relative pool utilizations are unbalanced, namely, when the QLC pool 400 has a significantly higher relative utilization than the SLC pool 402. As shown in FIG. 5 using solid lines, under high device utilization (e.g., when over 90% of a flash memory device is written with data), the write amplification of QLC pool 400 can increase exponentially, resulting in increasingly rapid wear out of blocks in QLC pool 400. Under moderate device utilization (e.g., below 80%), the total write amplification is almost constant because the optimal allocation of blocks to the pools results in approximately the same amount of relative overprovisioned capacity. However, when the relative utilization in the pools becomes unbalanced such that the QLC pool 400 has a significantly higher relative utilization than the SLC pool 402 for the same allocation of blocks to the pools, the increase in write amplification in the QLC pool 400 is greater than the decrease of write amplification in the SLC pool 402, and the overall write amplification increases significantly. It is therefore desirable to avoid an imbalance of utilization of QLC pool 400 and SLC pool 402 and/or restore a balance between utilization of QLC pool 400 and SLC pool 402.

Figures 6, 7:
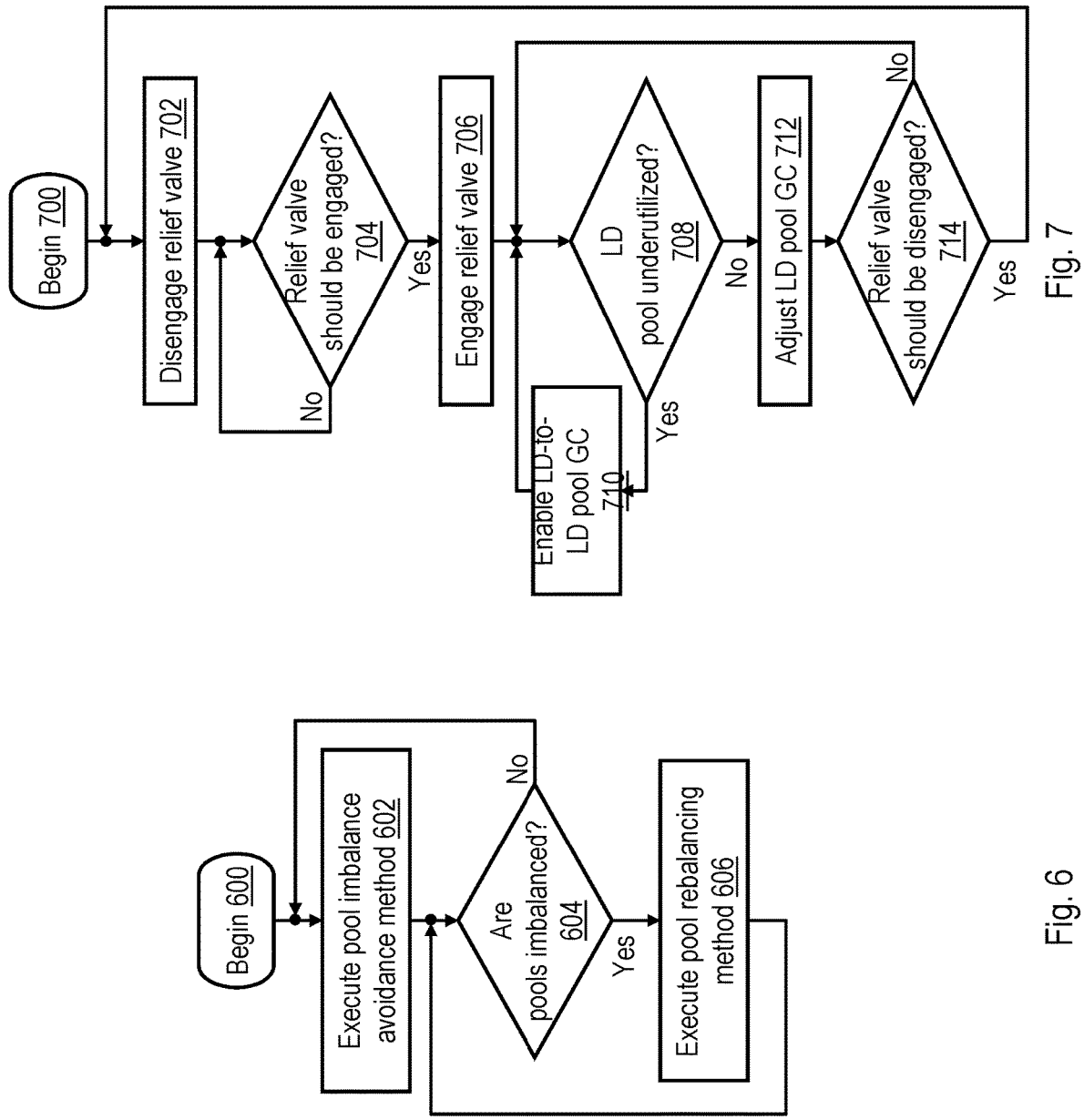
FIG. 6 is a high-level logical flowchart of an exemplary process for managing balance between pools of different storage densities in a multi-tier storage architecture in accordance with one embodiment.
FIG. 7 is a high-level logical flowchart of an exemplary process for avoiding imbalance between pools of storage in a multi-tier storage architecture in accordance with a first embodiment.

Referring now to FIG. 6, there is a high-level logical flowchart of an exemplary process by which a controller balances utilization of storage pools of differing storage densities in a multi-tier storage architecture in accordance with one embodiment. As with the other logical flowcharts presented herein, operations are presented in logical rather than strictly chronological order, and in some embodiments, operations can be performed in a different order than presented or concurrently.

The illustrated process can be performed, for example, by a controller (e.g., GPP 132 and/or flash controller 140) in hardware, firmware, software or a combination thereof during operation of a data storage system 120 having dynamically resizable pool sizes. Although the present disclosure describes implementation of this method in controller embodiments including a relief valve function, it should be appreciated that the method is applicable to controller architectures that do not implement a relief valve function (e.g., in controllers that regulate the volume of data written to each storage pool proportionally to the pool sizes). In either controller implementation, the disclosed method of balancing utilization of storage pools reduces or eliminates unnecessary pool resizing, reduces internal relocations (i.e., write amplification), and improves the overall read response time. The method also remediates pool imbalances in the background if a pool imbalance occurs. In both seeking to avoid pool imbalance and restoring pool balance, the method protects the storage performance of the host workload.

Figure 8:
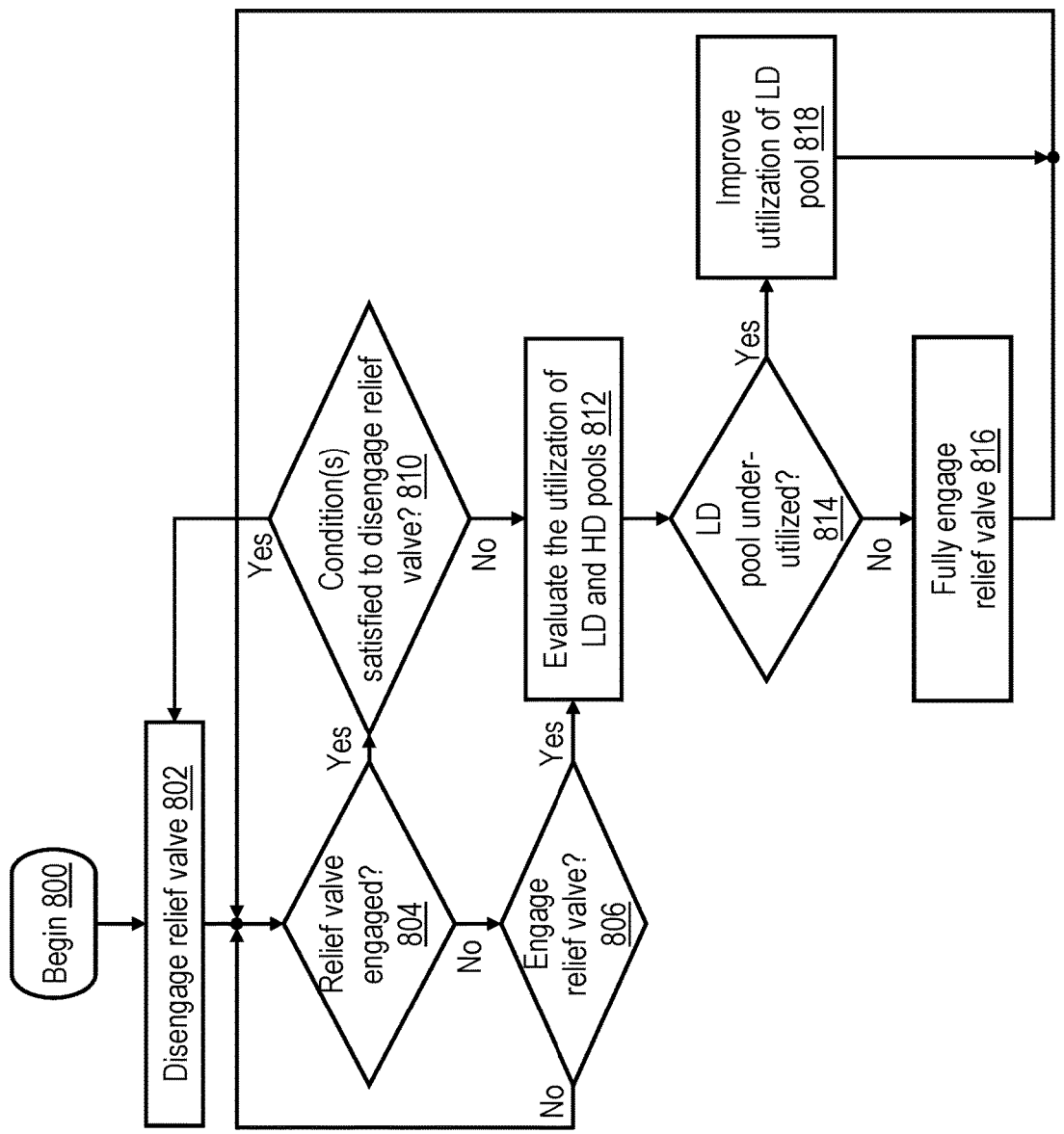
FIG. 8 is a high-level logical flowchart of an exemplary process for avoiding imbalance between pools of storage in a multi-tier storage architecture in accordance with a second embodiment.

The process of FIG. 6 begins at block 600 and then proceeds to block 602, which depicts the controller executing a pool imbalance avoidance method. A first embodiment of such a pool imbalance avoidance method is depicted in FIG. 7, and a second embodiment of a pool imbalance avoidance method is illustrated in FIG. 8. As indicated by the structures of FIGS. 7 and 8, the pool imbalance avoidance method can be performed continuously during operation of a NAND flash memory system 150. In the depicted embodiments of the pool imbalance avoidance methods, the controller actively monitors relative utilizations of the storage pools and makes data placement decisions based on pool utilization metrics (e.g., relative pool utilizations and absolute pool sizes) and/or the host write rate.

At block 604, the controller determines whether or not an imbalance in utilization of the storage pools is detected despite the use of the pool imbalance avoidance method. If not, the process returns to block 602. If, however, the controller determines at block 604 that an imbalance in utilization of the storage pools is detected despite execution of the pool imbalance avoidance method, the controller executes a pool rebalancing method, as depicted at block 606. An example of the pool rebalancing method is described below with reference to FIG. 9. In the pool rebalancing method, the controller generally detects periods with low host activity and, during such periods of low host activity, performs cleanup of physical blocks 204 in the low-density pool 305 (e.g., via SLC-to-SLC garbage collection), thus compacting the low-density pool 305 (e.g., decreasing a number of blocks in occupied block queues 302 and increasing a number of blocks in the RTU queues 306). In addition, the controller may relocate data from blocks in high-density pool 307 to low-density pool 305 until pools 305, 307 are rebalanced. To be clear, the controller may perform the pool imbalance avoidance method and the pool rebalancing method concurrently. Following execution of the pool rebalancing method, the process of FIG. 6 returns to block 604.

With reference now to FIG. 7, there is illustrated a high-level logical flowchart of an exemplary process for avoiding imbalance in utilization of storage pools in a multi-tier storage architecture in accordance with a first embodiment. The illustrated embodiment assumes an implementation of a controller that includes a relief valve function 314 that cannot be partially engaged, but can only toggled between disengaged and engaged states. Thus, if relief valve function 314 is disengaged, data placement function 310 initially stores all host write data into low-density pool 305, and if relief valve function 314 is engaged, data placement function 310 initially stores all host write data into high-density pool 307.

The method of FIG. 7 begins at block 700 and then proceeds to block 702, which illustrates that, by default, relief valve function 314 is disengaged, and data placement function 310 initially stores at least some (and possibly all) host write data into a low-density pool 305, such as SLC pool 402. In some embodiments, disengaging relief valve function 314 may further result in adjusting the garbage collection policy applicable to low-density pool 305 by, for example, re-enabling previously suspended garbage collection and wear leveling function 312 in low-density pool 305 and causing still-valid data collected by the garbage collection and wear leveling function 312 to be written to high-density pool 307 rather than to low-density pool 305. The process then proceeds to block 704, which illustrates a determination of whether or not relief valve function 314 should be engaged to temporarily prevent the initial storage of host write data directly into low-density pool 305. The controller may make the determination illustrated at block 704, for example, based on at least the utilization of low-density pool 305 and, optionally, additionally the utilization of high-density pool 307. The utilization can, in turn, be determined as a block utilization by comparing a fill level (e.g., as denominated in a number or percentage of physical blocks) in one or more RTU queue(s) 306 of the relevant storage pool with a lower first threshold for the relevant storage pool. In response to a determination that the utilization(s) indicate relief valve function 314 should not be engaged, the process iterates at block 704. However, based on a determination at block 704 that relief valve function 314 should be engaged, the controller engages relief valve function 314 to prevent host write data from initially being stored into physical blocks 204 of low-density pool 305 (block 706). In some embodiments, engaging the relief valve may also stop the garbage collection function applicable to low-density pool 305 as incoming host writes are no longer placed there. During the time interval that relief valve function 314 is engaged, host writes will continue to invalidate data stored in the physical blocks 204 of low-density storage pool 305 and hence will continue to decrease the relative pool utilization of low-density pool 305.

Following block 706, the process of FIG. 7 proceeds to block 708, which illustrates the controller determining whether or not the low-density pool 305 is underutilized. The controller may make the determination illustrated at block 708, for example, based on the relative pool utilization of the low-density pool 305 and/or high-density pools 307. In response to a determination at block 708 that the low-density pool 305 is underutilized, the process passes to block 710, where the garbage collection and wear leveling function 312 of the low-density pool 305 is enabled. Preferably, the garbage collection policy applicable to low-density pool 305 writes still-valid data collected by the garbage collection and wear-leveling function 312 back into low-density pool 305 rather than into high-density pool 307. In case the controller determines at block 708 that the low-density pool 305 is not underutilized, the process proceeds from block 708 to block 712, where the garbage collection process of the low-density pool 305 is adjusted. In a preferred embodiment, garbage collection of the low-density pool 305 may be reconfigured to destage valid data from the low-density pool 305 to the high-density pool 307 and/or may be completely suspended. Following block 712, the process of FIG. 7 proceeds to block 714, which illustrates the controller determining whether or not the relief valve function 314 should be disengaged to again allow the initial storage of host write data directly into low-density pool 305. The controller may make the determination illustrated at block 714, for example, based on at least the utilization of low-density pool 305 and, optionally, additionally the utilization of high-density pool 307. The utilization can, in turn, be determined as a block utilization by comparing a fill level (e.g., as denominated in a number or percentage of physical blocks) in one or more RTU queue(s) 306 of the relevant storage pool with a higher second threshold for the relevant storage pool. In response to a determination that the utilization(s) indicate relief valve function 314 should not be disengaged, the process returns to block 708. However, based on a determination at block 714 that relief valve function 314 should no longer be engaged, the controller disengages relief valve function 314 to again allow host write data to be initially stored into physical blocks 204 of low-density pool 305 (block 702).

Following block 702, the process of FIG. 7 thereafter continues as described. It should be appreciated that the relief valve implementation depicted in FIG. 7 may result in a small imbalance in pool utilization that can be corrected by the pool rebalancing method implemented at block 606 of FIG. 6.

Referring now to FIG. 8, there is depicted a high-level logical flowchart of an exemplary process for avoiding imbalance in utilization of storage pools in a multi-tier storage architecture in accordance with a second embodiment. The illustrated embodiment assumes a controller implementation that includes a relief valve function 314 that can selectively be disengaged, partially engaged (and preferably, variably engaged), or fully engaged. In this example, if relief valve function 314 is disengaged, data placement function 310 initially stores all host write data into low-density pool 305, and if relief valve function 314 is fully engaged, data placement function 310 initially stores all host write data into high-density pool 307. If relief valve function 314 is partially engaged, data placement function 310 initially stores some host write data into low-density pool 305 and some host write data into high-density pool 307.

The process of FIG. 8 begins at block 800 and then proceeds to block 802, which illustrates the controller initially disengaging relief valve function 314 by default. In some embodiments, disengaging relief valve function 314 may additionally result in adjusting the garbage collection policy applicable to low-density pool 305 by, for example, re-enabling previously suspended garbage collection and wear leveling function 312 and causing still-valid data collected by the garbage collection and wear leveling function 312 to be written to high-density pool 307 rather than to low-density pool 305. The controller subsequently determines at block 804 whether or not relief valve function 314 is engaged. If so, the process of FIG. 8 proceeds to block 810, which is described below. If not, the controller determines at block 806 whether or not the controller should engage the relief valve function 314 to at least partially restrict the initial storage of host write data directly into low-density pool 305. As discussed above with reference to block 704 of FIG. 7, the controller may make the determination illustrated at block 806, for example, based on at least the utilization of low-density pool 305 and, optionally, additionally the utilization of high-density pool 307. The utilization can, in turn, be determined as a block utilization by comparing a fill level (e.g., as denominated in a number or percentage of physical blocks) in one or more RTU queue(s) 306 of the relevant storage pool with a lower first threshold for the relevant storage pool. The determination at block 806 may alternatively or additionally be made based on the rate of receipt of incoming host write requests and a current write amplification metric of low-density pool 305 and/or high-density pool 307. In response to a determination that the pool utilization(s) indicate relief valve function 314 should not be engaged, the process returns to block 804, which had been described. However, based on a determination at block 806 that relief valve function 314 should be at least partially engaged, the process passes to block 812 and following blocks, which are described below. Note that engaging relief valve function 314 may additionally result in the adjustment of the garbage collection policy applicable to the low-density pool 305 by, for example, suspending the garbage collection and wear leveling function 312 of low-density pool 305 when relief valve function 314 is fully engaged as incoming host writes are no longer placed there.

Referring to block 810, controller determines whether or not one or more disengagement conditions are satisfied for disengaging relief valve function 314. The disengagement condition(s) can include, for example, the fill level(s) of RTU queue(s) 306, the rate of incoming host write requests, and/or the current write amplification metrics for pools 305.307. In response to a determination at block 810 that the disengagement condition(s) is/are satisfied, the process returns to block 802, which has been described. If, however, the controller determines at block 810 that the disengagement condition(s) for relief valve function 314 is/are not satisfied, the process of FIG. 8 proceeds to block 812.

Block 812 illustrates the controller evaluating the utilization of pools 305, 307, for example, by reference to the relative pool utilization and/or fill levels of RTU queues 306. Based on the evaluation made at block 812, the controller determines at block 814 whether or not low-density pool 305 is under-utilized. For example, as described above with reference to block 714 of FIG. 7, the under-utilization can be determined based on the relative pool utilization of the low-density pool 305 being lower than that of the high-density pool 307 or falling below a relative pool utilization threshold or the fill level of the relevant RTU queue(s) 306 being greater than a second threshold. In response to a negative determination at block 814, the controller fully engages relief valve function 314 to temporarily prevent host write data from initially being stored into physical blocks 204 of low-density pool 305 (block 816). As noted above, during the time interval that relief valve function 314 is fully engaged, host writes will continue to invalidate data stored in the physical blocks 204 of low-density storage pool 305 and will consequently continue to decrease the utilization of low-density pool 305.

Based on a determination at block 814 that low-density pool 305 is under-utilized, controller makes adjustments to its policies to improve utilization of low-density pool 305. For example, in some embodiments, the controller may partially engage relief valve function 314. For example, the controller may determine an engagement percentage based on the relative utilizations of pools 305, 307, the sizes of pools 305, 307, and/or the rate of incoming host write requests. The controller may then apply relief valve function 314 proportionally in order to direct write data of the engagement percentage of incoming write requests to low-density pool 305 and to direct write data of the remainder of the host write requests to high-density pool 307. In some embodiments, the controller may alternatively or additionally change the garbage collection policy applied to low-density pool 305 at block 818. For example, the controller may adjust the garbage collection policy applicable to low-density pool 305 by causing still-valid data collected by the garbage collection and wear leveling function 312 to be written back into low-density pool 305 rather than into high-density pool 307. Following either block 816 or block 818, the process of FIG. 8 returns to block 804, which has been described.

Figure 9:
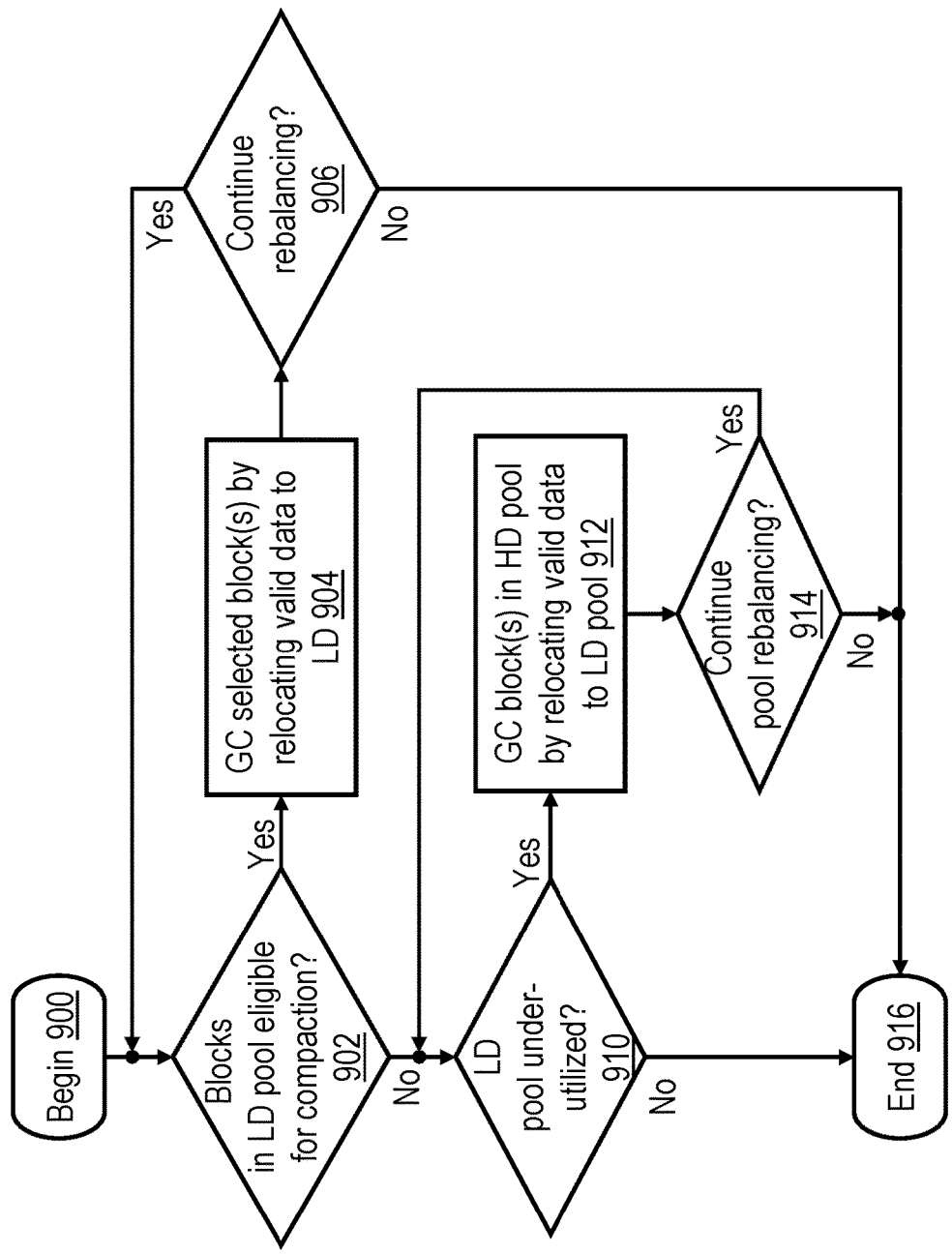
FIG. 9 is a high-level logical flowchart of an exemplary process for pool rebalancing in accordance with one embodiment.

With reference now to FIG. 9, there is illustrated a high-level logical flowchart of an exemplary process for pool rebalancing in accordance with one embodiment. The process may be performed by the controller, for example, at block 606 of FIG. 6. The controller may condition performing the illustrated method on one or a combination of conditions, including, for example, relief valve function 314, if present, being fully disengaged, the rate of incoming host writes being less than a rebalancing threshold, the controller determining that low-density pool 305 is under-utilized (as discussed above with reference to block 814), and the controller having no on-going pool resizing operation.

The process of FIG. 9 begins at block 900 and then proceeds to block 902, which illustrates the controller determining whether or not one or more physical blocks 204 in occupied blocks queue(s) 302 of low-density pool 305 are eligible for compaction, meaning, for example, that the physical blocks 204 contain more than compaction threshold of invalid data. In response to a negative determination at block 902, the process passes to block 910, which is described below. In response, however, to an affirmative determination at block 902, the controller invokes garbage collection and wear leveling function 312 to perform garbage collection on the eligible blocks identified at block 902 (block 904). The still-valid data collected from the physical blocks 204 is stored back into low-density pool 305. At block 906, the controller determines whether or not to continue pool rebalancing, for example, based on the relative utilization of pools 305, 307 and/or a rate of incoming host write requests. If so, the process of FIG. 9 returns to block 902, which has been described. If not, the process passes from block 906 to block 916, at which the process of FIG. 9 terminates.

At block 910, the controller determines whether or not low-density pool 305 is under-utilized. For example, under-utilization of low-density pool 305 can be determined by comparing the relative pool utilization of low-density pool 305 with a pool utilization threshold. In response to a negative determination at block 910, the process of FIG. 9 ends at block 916. If, however, the controller determines at block 910 that low-density pool 305 is under-utilized, the controller invokes garbage collection and wear leveling function 312 to perform garbage collection on one or more eligible blocks in high-density pool 307 and stores the still-valid data collected from high-density pool 307 into low-density pool 305 (block 912). In a preferred embodiment, garbage collection and wear leveling function 312 selects still-valid data which is frequently read compared to other valid data in low-density pool 307. The selection can, for example, be made by comparing read heat counters for blocks and/or pages or by maintaining separate data structures to quickly identify the most frequently read pages and/or blocks. At block 914, the controller determines whether or not to continue pool rebalancing, for example, based on the relative utilization of pools 305, 307 of each pool and/or a rate of incoming host write requests. In response to an affirmative determination at block 914, the process of FIG. 9 returns to block 910, which has been described. In response to a negative determination at block 914, the process of FIG. 9 passes from block 914 to block 916, at which the process of FIG. 9 terminates.

As has been described, in at least one embodiment, a non-volatile memory includes a plurality of physical blocks each including a respective plurality of cells, where each cell is individually capable of storing multiple bits of data. A controller for the non-volatile memory maintains dynamically resizable pools of physical blocks including at least a low-density pool of physical blocks in which cells are configured to store a fewer number of bits (e.g., in SLC mode) and a high-density pool of physical blocks in which cells are configured to store a greater number of bits (e.g., in QLC mode). The controller detects an imbalance between utilizations of the low-density and high-density pools and, based on detection of the pool imbalance, restricts data placement in the low-density pool, enabling garbage collection of data from the low-density pool back into the low-density pool to compact the low-density pool, and re-enabling data placement to the low-density pool based on availability of a threshold number of free physical blocks in the low-density pool.

In some embodiments, the controller, based on detection of restoration of balance between the low-density and high-density pools, destages data garbage collected from physical blocks in the low-density pool to physical blocks in the high-density pool.

In some embodiments, the controller ending the restricting of data placement in the low-density pool based on detection that a pool utilization satisfies a threshold.

In some embodiments, the controller additionally implements pool rebalancing. To implement pool rebalancing the controller, based upon detecting a low rate of host write requests, may relocate data from the high-density pool into the low-density pool until the high-density and low-density pools are balanced.

In some embodiments, the controller proportionally varying a degree of restriction of data placement in the low-density pool based on a difference between pool utilizations of the low-density pool and the high-density pool.

In some embodiments, the controller detects the pool imbalance by detecting utilization of the high-density pool is greater than utilization of the low-density pool.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

In addition, although embodiments have been described that include use of a NAND flash memory, it should be appreciated that embodiments of the present invention can also be used with any other type of non-volatile random access memory (NVRAM).

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of operating a non-volatile memory including a plurality of physical blocks of storage each including a respective plurality of cells, wherein each of the plurality of cells is individually capable of storing multiple bits of data, the method comprising:
    a controller for the non-volatile memory maintaining dynamically resizable pools of physical blocks of the non-volatile memory including at least a low-density pool and a high-density pool, wherein cells in physical blocks in the low density pool are all configured to store a first number of bits and cells in physical blocks in the high-density pool are all configured to store a second number of bits, and wherein the second number of bits is greater than the first number of bits;
    the controller detecting a pool imbalance between utilization of physical blocks in the low-density pool and utilization of physical blocks in the high-density pool and, based on detection of said pool imbalance, the controller:
        restricting data placement in physical blocks in the low-density pool while continuing data placement in physical blocks in the high-density pool;
        while data placement in physical blocks in the low-density pool is restricted, enabling garbage collection of data from the low-density pool back into the low-density pool to compact the low-density pool; and
        ending the restricting of data placement in physical blocks in the low-density pool based on availability of a threshold number of free physical blocks in the low-density pool.

2. The method of claim 1, and further comprising:
    the controller, based on detection of restoration of balance between the low-density and high-density pools, destaging data garbage-collected from physical blocks in the low-density pool to physical blocks in the high-density pool.

3. The method of claim 2, and further comprising:
    the controller ending the restricting of data placement in the low-density pool based on detection that a pool utilization satisfies a threshold.

4. The method of claim 2, and further comprising:
    the controller implementing pool rebalancing, wherein implementing pool rebalancing includes the controller, based upon detecting a low rate of host write requests, relocating data from the high-density pool into the low-density pool until the high-density and low-density pools are balanced.

5. The method of claim 1, wherein the restricting comprises the controller proportionally varying a degree of restriction of data placement in the low-density pool based on a difference between pool utilizations of the low-density pool and the high-density pool.

6. The method of claim 1, wherein detecting the pool imbalance includes the controller detecting utilization of the high-density pool is greater than utilization of the low-density pool.

7. The method of claim 1, wherein the physical blocks in the low-density pool are configured as single level cell (SLC) blocks.

8. The method of claim 1, wherein:
the physical blocks in the high-density pool are configured as quad level cell (QLC) blocks.

9. A data storage system, comprising:
a controller for a non-volatile memory including a plurality of physical blocks of storage each including a respective plurality of cells, wherein each of the plurality of cells is individually capable of storing multiple bits of data, wherein the controller is configured to perform:
maintaining dynamically resizable pools of physical blocks of the non-volatile memory including at least a low-density pool and a high-density pool, wherein cells in physical blocks in the low high density pool are all configured to store a first number of bits and cells in physical blocks in the high-density pool are all configured to store a second number of bits, and wherein the second number of bits is greater than the first number of bits;
detecting a pool imbalance between utilization of physical blocks in the low-density pool and utilization of physical blocks in the high-density pool and, based on detection of said pool imbalance:
restricting data placement in physical blocks in the low-density pool while continuing data placement in physical blocks in the high-density pool;
while data placement in physical blocks in the low-density pool is restricted, enabling garbage collection of data from the low-density pool back into the low-density pool to compact the low-density pool; and
ending the restricting of data placement in physical blocks in the low-density pool based on availability of a threshold number of free physical blocks in the low-density pool.

10. The data storage system of claim 9, wherein the controller is further configured to perform:
based on detection of restoration of balance between the low-density and high-density pools, destaging data garbage-collected from physical blocks in the low-density pool to physical blocks in the high-density pool.

11. The data storage system of claim 10, wherein the controller is further configured to perform:
ending the restricting of data placement in the low-density pool based on detection that a pool utilization satisfies a threshold.

12. The data storage system of claim 10, wherein the controller is further configured to perform:
implementing pool rebalancing, wherein implementing pool rebalancing includes the controller, based upon detecting a low rate of host write requests, relocating data from the high-density pool into the low-density pool until the high-density and low-density pools are balanced.

13. The data storage system of claim 9, wherein the restricting includes:
proportionally varying a degree of restriction of data placement in the low-density pool based on a difference between pool utilizations of the low-density pool and the high-density pool.

14. The data storage system of claim 9, wherein detecting the pool imbalance includes the controller detecting utilization of the high-density pool is greater than utilization of the low-density pool.

15. The data storage system of claim 9, wherein the physical blocks in the low-density pool are configured as single level cell (SLC) blocks and the physical blocks in the high-density pool are configured as quad level cell (QLC) blocks.

16. A computer program product, the computer program product comprising a computer readable storage medium having program instructions embodied therewith, the program instructions being executable by a controller of a non-volatile memory including a plurality of cells each individually capable of storing multiple bits of data, wherein, when executed, the program instructions cause the controller to perform:
maintaining dynamically resizable pools of physical blocks of the non-volatile memory including at least a low-density pool and a high-density pool, wherein cells in of physical blocks in the low density pool are all configured to store a first number of bits and cells in physical blocks in the high-density pool are all configured to store a second number of bits, and wherein the second number of bits is greater than the first number of bits;
detecting a pool imbalance between utilization of physical blocks in the low-density pool and utilization of physical blocks in the high-density pool and, based on detection of said pool imbalance:
restricting data placement in physical blocks in the low-density pool while continuing data placement in physical blocks in the high-density pool;
while data placement in physical blocks in the low-density pool is restricted, enabling garbage collection of data from the low-density pool back into the low-density pool to compact the low-density pool, and
ending the restricting of data placement in physical blocks in the low-density pool based on availability of a threshold number of free physical blocks in the low-density pool.

17. The computer program product of claim 16, wherein the controller is further configured to perform:
based on detection of restoration of balance between the low-density and high-density pools, destaging data garbage-collected from physical blocks in the low-density pool to physical blocks in the high-density pool.

18. The computer program product of claim 17, wherein the controller is further configured to perform:
ending the restricting of data placement in the low-density pool based on detection that a pool utilization satisfies a threshold.

19. The computer program product of claim 17, wherein the controller is further configured to perform:
implementing pool rebalancing, wherein implementing pool rebalancing includes the controller, based upon detecting a low rate of host write requests, relocating data from the high-density pool into the low-density pool until the high-density and low-density pools are balanced.

20. The computer program product of claim 16, wherein detecting the pool imbalance includes the controller detecting utilization of the high-density pool is greater than utilization of the low-density pool.

* * * * *